(12) United States Patent
Vij et al.

(10) Patent No.: US 11,042,909 B2
(45) Date of Patent: Jun. 22, 2021

(54) TARGET IDENTIFICATION USING BIG DATA AND MACHINE LEARNING

(71) Applicant: Accenture Global Solutions Limited, Dublin (IE)

(72) Inventors: Abhinav Vij, Gurgaon (IN); Gaurav Goyal, New Delhi (IN); Prithika Priyanshi, Gurugram (IN); Anupam Shringi, Gurgaon (IN); Chinmay Jha, Gurgaon (IN); Saurabh Aggarwal, Uttarpradesh (IN); Abhishek Sunnak, Punjab (IN); Vijay Saini, Delhi (IN); Aashish Kumar, Gurgaon (IN); Shivam Singh Baghel, Gurgaon (IN); Rashmi Aggarwal, Haryana (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/046,507

(22) Filed: Jul. 26, 2018

(65) Prior Publication Data

US 2019/0244253 A1 Aug. 8, 2019

(30) Foreign Application Priority Data

Feb. 6, 2018 (IN) .............................. 201841004446

(51) Int. Cl.
*G06Q 30/00* (2012.01)
*G06N 20/00* (2019.01)
(Continued)

(52) U.S. Cl.
CPC ......... *G06Q 30/0271* (2013.01); *G06F 40/00* (2020.01); *G06F 40/30* (2020.01);
(Continued)

(58) Field of Classification Search
None
See application file for complete search history.

(56) References Cited

U.S. PATENT DOCUMENTS 9,460,401 B2 10/2016 Zeng et al.
10,373,194 B2 * 8/2019 Opie .................. G06Q 30/0242
(Continued)

OTHER PUBLICATIONS

Information on DirectMail.com, 2013, archived web pages printed through www.archive.org, data is in the URL in YYYYMMDD format (Year: 2013).*

(Continued)

*Primary Examiner* — Naresh Vig
(74) *Attorney, Agent, or Firm* — Harrity & Harrity, LLP

(57) ABSTRACT

A device may obtain, from a collection of data sources, personal information and activity information for a group of individuals. The device may generate profile information by associating the personal information and the activity information for each individual in the group of individuals. The device may determine a set of features capable of being used to train a set of machine learning models by using one or more feature identification techniques to analyze the profile information. The set of features may include generic features and contextualized features associated with the group of individuals. The device may train the set of machine learning models using one or more subsets of features of the set of features. The device may use the set of machine learning models to process a request from a client device for a list of prospective targets for a campaign.

20 Claims, 6 Drawing Sheets

(51) Int. Cl.
*G06Q 30/02* (2012.01)
*G06K 9/62* (2006.01)
*G06F 40/00* (2020.01)
*G06F 40/30* (2020.01)

(52) U.S. Cl.
CPC .......... *G06K 9/6256* (2013.01); *G06N 20/00* (2019.01); *G06Q 30/0276* (2013.01)

(56) References Cited

U.S. PATENT DOCUMENTS

| | | | |
|---|---|---|---|
| 2010/0262464 A1* | 10/2010 | Monteforte | G06Q 10/00 705/7.29 |
| 2012/0054040 A1* | 3/2012 | Bagherjeiran | G06Q 30/00 705/14.66 |
| 2013/0117081 A1* | 5/2013 | Wilkins | G06Q 30/0248 705/14.4 |
| 2015/0006295 A1* | 1/2015 | Liu | G06Q 50/01 705/14.66 |
| 2016/0283863 A1* | 9/2016 | Bowers | G06Q 30/00 |
| 2018/0040035 A1* | 2/2018 | Qi | G06Q 30/0255 |
| 2018/0129961 A1* | 5/2018 | Kailas | G06N 7/005 |
| 2018/0144243 A1* | 5/2018 | Hsieh | G06N 3/0454 |

OTHER PUBLICATIONS

Genueretal., VSURF—An R Package for Variable Selection Using Random Forests, Dec. 2015, The R Journal, vol. 7/2 (Year: 2015).*

Kendall Fortney, Pre-Processing in Natural Language Machine Learning, Nov. 28, 2017, TowardsDataScience.com (Year: 2017).*

Machine Learning, Feb. 3, 2018, Wikipedia, printed through www.archive.org, date is in the URL in YYYYMMDD format (Year: 2018).*

What are features in machine learning, 2017, www.quora.com (Year: 2017).*

Wikipedia article "Feature (machine learning)", Dec. 22, 2017, www.wikipedia.com (Year: 2017).*

Jason Brownlee article "Discover Feature Engineering, How to Engineer Features and How to Get Good at It", Sep. 26, 2014, MachineLearningMastery.com (Year: 2014).*

Prashant Gupta, Regularization in Machine Learning, Nov. 15, 2017, www.towardsdatascience.com (Year: 217).*

Genueretal., VSURF—An R Package for Variable Selection USing Random Forests, Dec. 2015, R Journal, vol. 7/2 (Year: 2015).*

Good et al., "Combining Collaborative Filtering with Personal Agents for Better Recommendations", 1999, AAAI (www.aaai.org) (Year: 1999).*

* cited by examiner

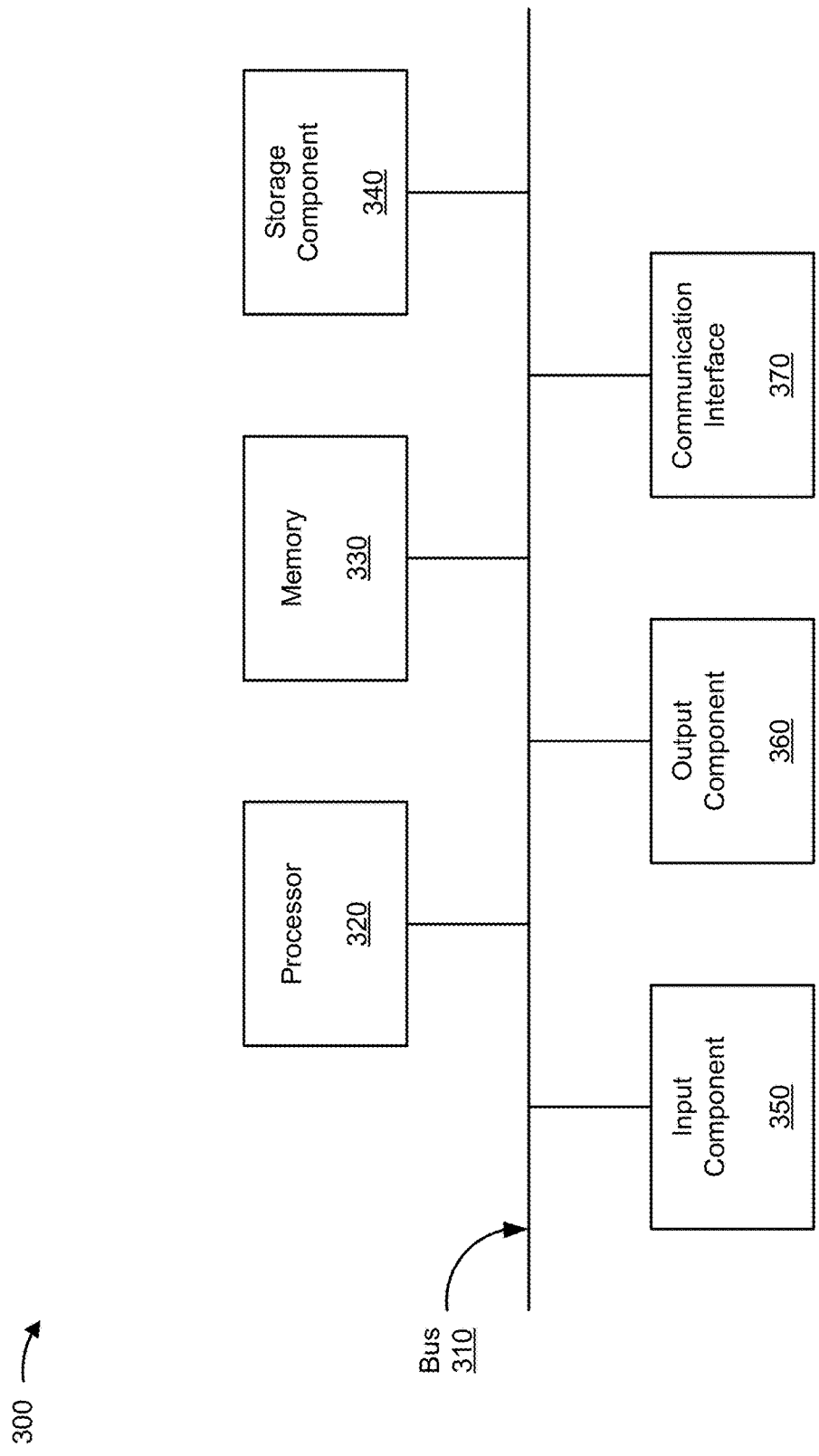

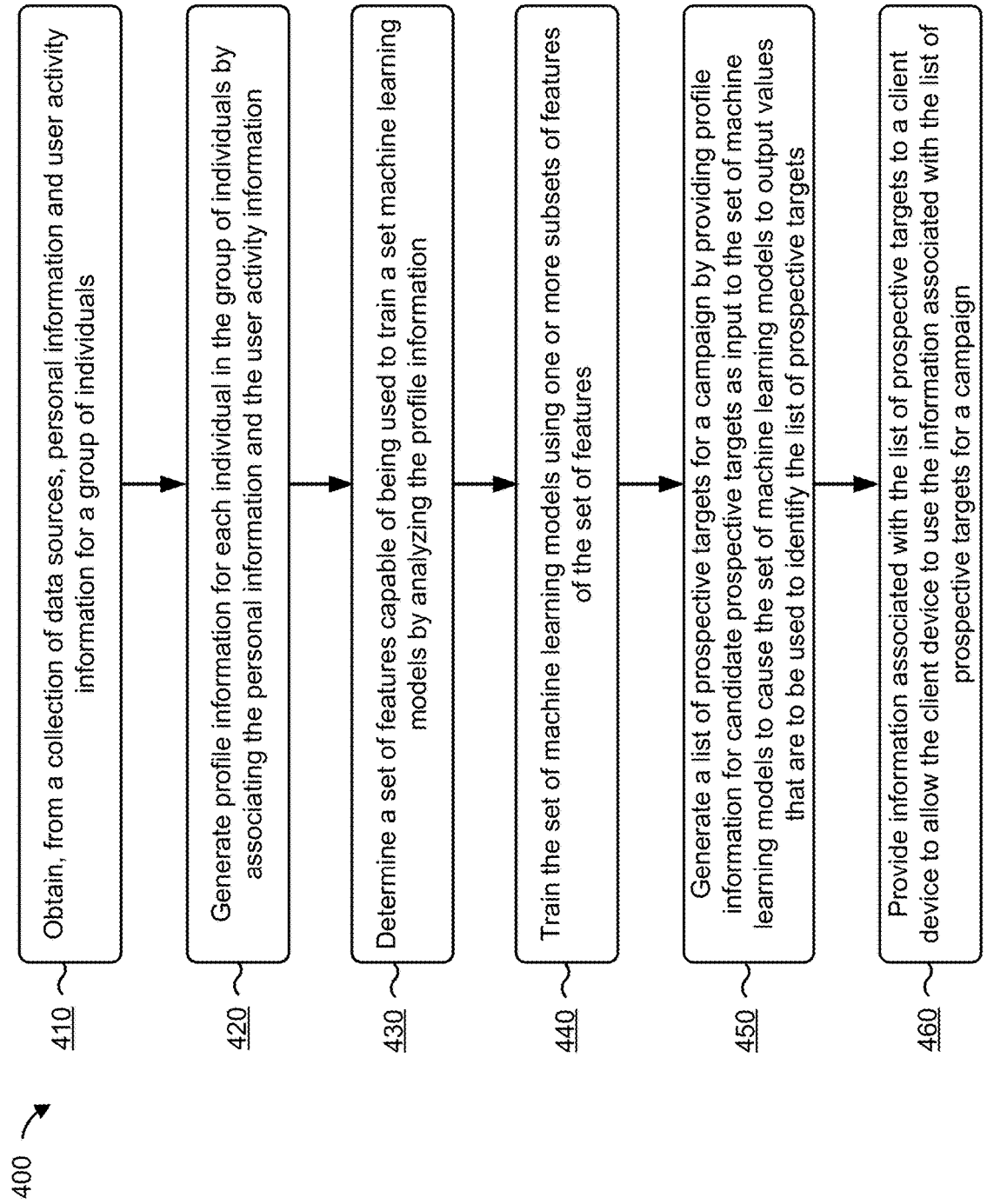

TARGET IDENTIFICATION USING BIG DATA AND MACHINE LEARNING

RELATED APPLICATION

This application claims priority under 35 U.S.C. § 119 to Indian Patent Application No. 201841004446, filed on Feb. 6, 2018, the content of which is incorporated by reference herein in its entirety.

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some possible implementations, a device may include one or more processors to obtain, from a collection of data sources, personal information and activity information for a group of individuals. The one or more processors may generate profile information by associating the personal information and the activity information for each individual in the group of individuals. The one or more processors may determine a set of features capable of being used to train a set of machine learning models by using one or more feature identification techniques to analyze the profile information. The set of features may include generic features and contextualized features associated with the group of individuals. The one or more processors may select, using one or more feature selection techniques, one or more subsets of features, of the set of features, to be used for training the set of machine learning models. Each subset of features, of the one or more subsets of features, may identify measurable properties associated with one or more segments of individuals within the group of individuals. The one or more processors may train the set of machine learning models using the one or more subsets of features. The set of machine learning models may be trained to output values indicating a degree to which each individual in the group of individuals is a prospective target for a campaign. The one or more processors may receive, from a client device, a request for a list of prospective targets to target for the campaign. The one or more processors may use the set of machine learning models to determine the list of prospective targets for the campaign. The one or more processors may provide information associated with the list of prospective targets to the client device to allow the list of prospective targets to be used in the campaign.

According to some possible implementations, a non-transitory computer-readable medium may store one or more instructions that, when executed by the one or more processors, cause the one or more processors to receive a set of machine learning models that have been trained using one or more subsets of features, of a set of features that include generic features and contextualized features associated with a group of individuals. Each subset of features, of the one or more subsets of features, may identify measurable properties associated with one or more segments of individuals within the group of individuals. The set of machine learning models may be trained to output values indicating a degree to which each individual in the group of individuals is a prospective target for a campaign. The one or more instructions may cause the one or more processors to receive, from a client device, a request for a list of prospective targets for the campaign. The one or more instructions may cause the one or more processors to use the set of machine learning models to determine the list of prospective targets to use for the campaign. The one or more instructions may cause the one or more processors to provide information associated with the list of prospective targets to the client device to allow the list of prospective targets to be used in the campaign.

According to some possible implementations, a method may include obtaining, by a device and from a collection of data sources, personal information and activity information for a group of individuals. The method may include generating, by the device, profile information by associating the personal information and the activity information for each individual in the group of individuals. The method may include determining, by the device, a set of features capable of being used to train a set of machine learning models by using one or more feature identification techniques to analyze the profile information. The set of features may include generic features and contextualized features associated with the group of individuals. The method may include training, by the device, the set of machine learning models using one or more subsets of features of the set of features. The set of machine learning models may be trained to output values indicating a degree to which each individual in the group of individuals is a prospective target for a campaign. The method may include using, by the device, the set of machine learning models to process a request from a client device for a list of prospective targets for the campaign.

BRIEF DESCRIPTION OF THE DRAWINGS

FIG. 3 is a diagram of example components of one or more devices of FIG. 2; and

FIG. 4 is a flow chart of an example process for using a set of machine learning models to identify targets.

DETAILED DESCRIPTION

The following detailed description of example implementations refers to the accompanying drawings. The same reference numbers in different drawings may identify the same or similar elements.

An organization may launch a campaign to identify prospective targets. For example, a network security organization that provides cybersecurity services may identify targets as prospective service recipients, and may deploy a process directed toward influencing target behavior (e.g., turning the targets into service recipients). Alternatively, the organization could be a bank that may be identifying prospective loan customers.

However, the organization may not have access to data needed to effectively identify prospective targets. Additionally, the organization may categorize individuals as prospective targets based on business rules (e.g., via a custom audience selection), or market triggers, but may be unable to identify prospective targets at an appropriate point in time (i.e., at a stage where target behavior can be influenced by the campaign).

Some implementations described herein provide a digital intelligence platform to use a set of machine learning models that are trained on generic features and contextualized features to identify a list of prospective targets for a campaign. For example, the digital intelligence platform may obtain, from a collection of data sources, personal information and activity information for a group of individuals. In this case, the digital intelligence platform may generate profile information for each individual in the group of individuals by associating the personal information and activity information with each other.

Additionally, the digital intelligence platform may determine a set of features capable of being used for training a set of machine learning models by analyzing the profile information. In this case, the digital intelligence platform may select one or more subsets of features, of the set of features, and may use the one or more subsets of features to train the set of machine learning models. Furthermore, the digital intelligence platform may use the set of machine learning models to process a request from a client device for a list of prospective targets for the campaign.

In this way, the digital intelligence platform is able to use the set of machine learning models to identify prospective targets for the campaign. Furthermore, the digital intelligence platform conserves processing resources and/or network resources that might otherwise be used to identify prospective targets that are unlikely to be receptive to a particular campaign, conserves processing resources and/or network resources relative to an inferior cloud platform that might need to re-identify prospective targets after an unsuccessful identification, and/or the like.

Figure 1A:
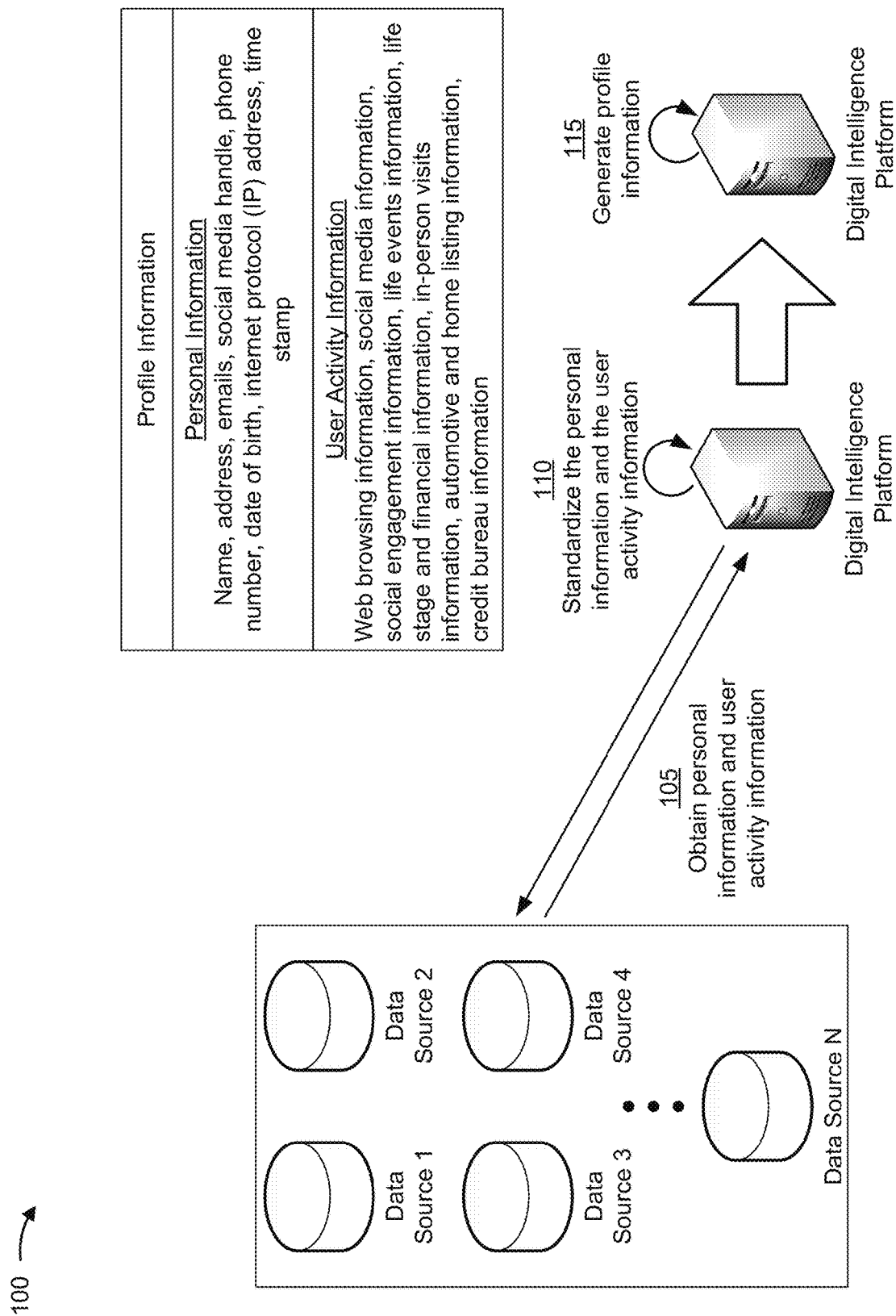
FIGS. 1A-1C are diagrams of an overview of an example implementation described herein.
Figure 1B:
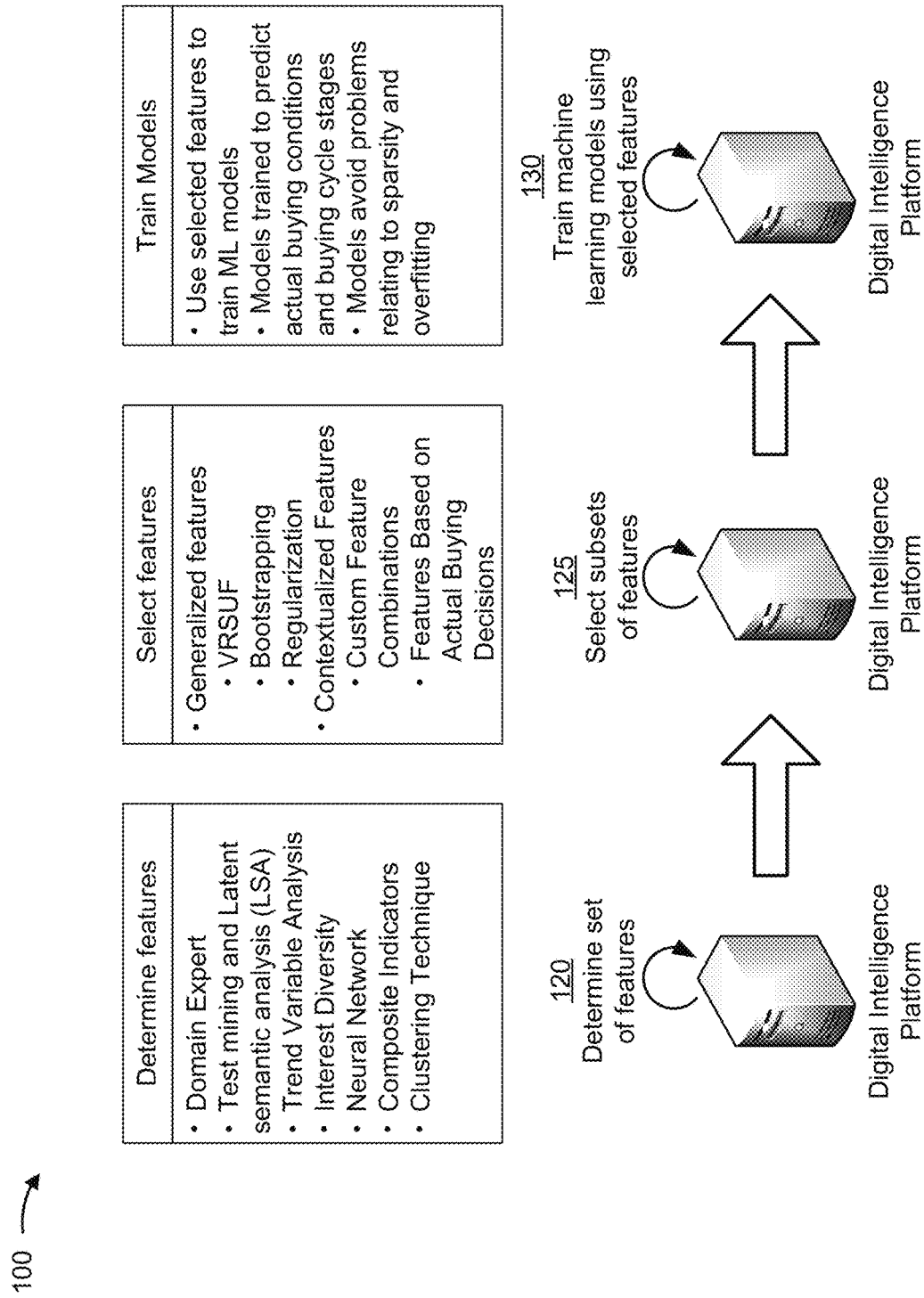
Figure 1C:
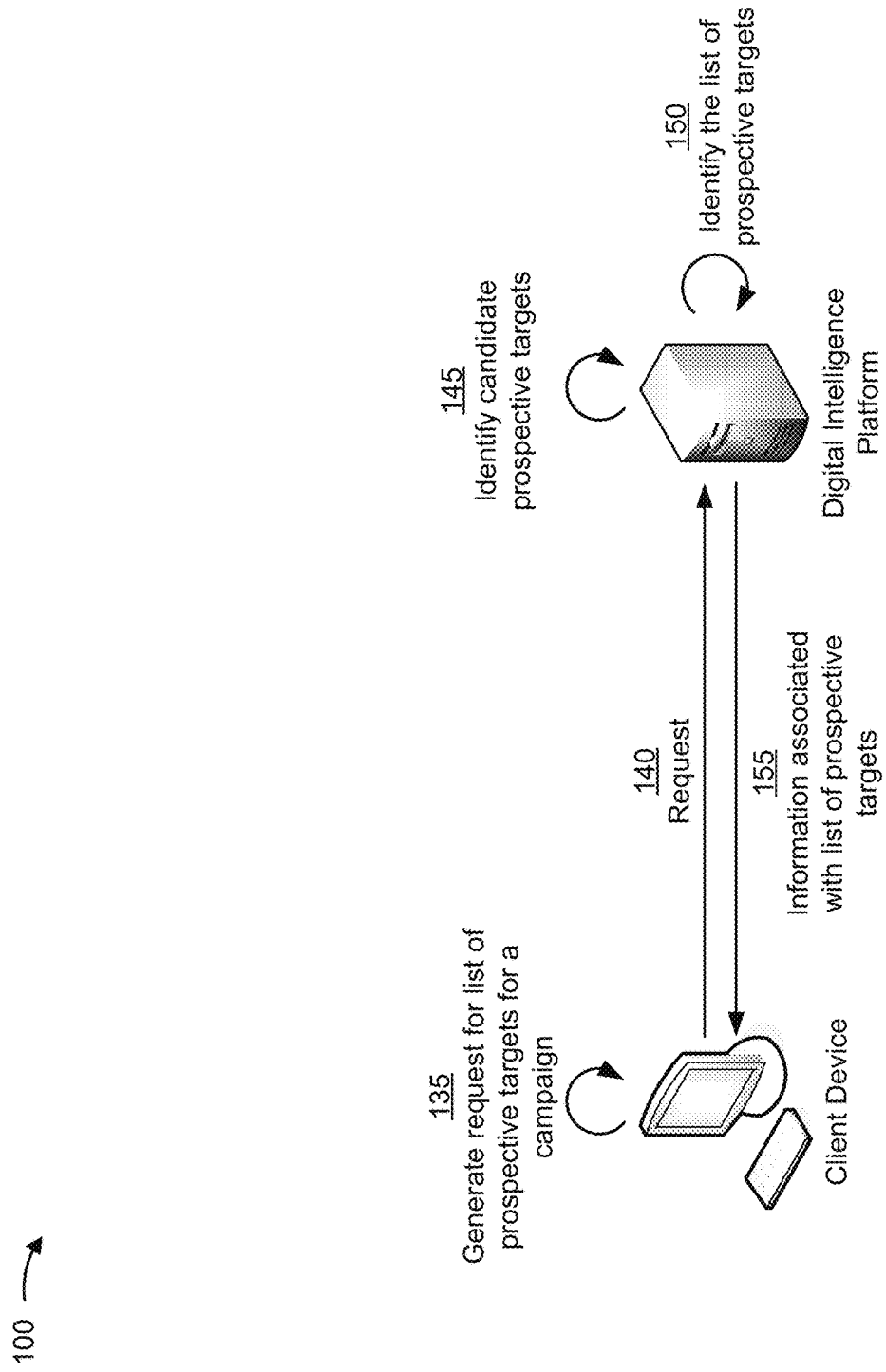

FIGS. 1A-1C are diagrams of an overview of an example implementation 100 described herein. As shown in FIGS. 1A-1C, example implementation 100 may include a digital intelligence platform that uses machine learning models to identify prospective targets for loans (e.g., a home loan, an auto loan, etc.). The prospective targets may be individuals or some other addressable unit (e.g., a family unit). In practice, the digital intelligence platform may identify prospective targets for campaigns relating to any number of different types of goods and/or services, such as cybersecurity services or network security services (e.g., virus monitoring).

As shown in FIG. 1A, and by reference number 105, the digital intelligence platform may obtain, from a collection of data sources, personal information and activity information associated with a group of individuals, such as a population of individuals. In some cases, the digital intelligence platform may obtain the personal information from a first data source, and may obtain the activity information from one or more additional data sources, as described in detail further herein.

The personal information may include personally identifiable information (PII) values for each individual in the group of individuals, such as a name value, an address value, a date of birth value, an e-mail address value, a phone number value, a social media handle value, an internet protocol (IP) address value associated with a device used by a particular individual, and/or the like. The activity information may include web browsing information, social media information, social engagement information, life events information, life stage and financial information, in-person visits information, domain information, and/or the like, as each described further herein. As an example, if an organization using the digital intelligence platform to identify prospective targets is a loan provider, domain information may include automotive and home listing information, credit bureau information, and/or the like.

As shown by reference number 110, the digital intelligence platform may standardize the obtained information (e.g., the personal information and the activity information). For example, the digital intelligence platform may obtain information associated with different data types, data formats, and/or the like, and may standardize the information to a uniform data type, data format, and/or the like. In standardizing the information, the digital intelligence platform may select and apply different standardization techniques to different data types or data formats.

As shown by reference number 115, the digital intelligence platform may generate profile information. For example, the digital intelligence platform may generate profile information by associating the personal information and the activity information of each individual in the group of individuals. As an example, a data source may include PII for a particular individual that includes a name value, and the digital intelligence platform may identify the same name value as part of a particular user's web browsing information. In this case, the digital intelligence platform may, based on the matching name value, determine that the web browsing information and the activity information are both associated with the particular individual, and may generate profile information for the particular individual that includes both the PII and the web browsing information.

In some cases, personal information values may not correspond directly to activity information values. As an example, in many cases, IP addresses may be volatile in nature, and the same IP address may, over time, be assigned to multiple devices that are associated with different individuals. In these cases, the digital intelligence platform may execute one or more natural language processing techniques, such as techniques using fuzzy logic, to be able to associate personal information values with activity information values for the same individual. Additionally, inaccuracies that may occur while executing the techniques that use fuzzy logic may be controlled and minimized by adjusting thresholds, as described further herein.

In this way, the digital intelligence platform is able to use personal information and activity information to generate profile information for the group of individuals.

As shown in FIG. 1B, and by reference number 120, the digital intelligence platform may determine a set of features based on the profile information. For example, the digital intelligence platform may determine a set of features using a feature identification technique, such as text mining and latent semantic analysis (LSA), a trend variable analysis, an interest diversity analysis, a neural network, a composite indicators analysis, a clustering analysis, and/or the like, as each described further herein. Additionally, the digital intelligence platform may determine tens of thousands of features, hundreds of thousands of features, or more, by processing millions, billions, or more, of profile information values. In this way, the digital intelligence platform may process a quantity of data that cannot be processed objectively by a human actor.

A feature may be a measurable property or characteristic that may be used for training a machine learning model, such as a property relating to a particular individual or demographic of individuals, a property associated with aggregating a particular type of information, a property identifying a benchmark for a particular individual or class of individuals, a property capable of being used as a signal of interest for a particular good or service, and/or the like. In some cases, a feature may relate to a browsing behavior, an affinity, an interest, a life event, a keyword, a uniform resource locator (URL), a viewed webpage, a clicked or selected button, a type of content, a device used at a particular time period, and/or the like.

As shown by reference number 125, the digital intelligence platform may select one or more subsets of features from the set of features. For example, the digital intelligence platform may use one or more feature selection techniques to process the set of features and select optimal subsets of features to use for training machine learning models. In this case, different types of features may be more effective in identifying prospective targets for different segments of individuals and/or for different groups of profile information values. In this way, the digital intelligence platform may conserve processing resources by selecting optimal subsets of features that are more effective in identifying prospective targets relative to an inferior platform that does not select optimal subsets of features.

In some implementations, the digital intelligence platform may select one or more subsets of features that include generic features and/or contextualized features. In some implementations, the digital intelligence platform may select one or more subsets of features using one or more machine learning techniques that reduce sparsity, that reduce overfitting, and/or the like.

As an example, the digital intelligence platform may select generalizable features for processing profile information values for segments of individuals where data is sparse. For example, individuals over an age of 65 may not spend a lot of time online, which may result in these individuals having a small online footprint. Because there is less data available to analyze this particular segment of individuals, low-level contextualized features may not be strong indicators of whether individuals over the age of 65 are prospective targets for the campaign. As such, the digital intelligence platform may select generalizable features to use to train machine learning models that process profile information values for the individuals over the age of 65. In this example, the digital intelligence platform may select generalized features by performing a variable selection using random forest (VSURF) analysis, a bootstrapping analysis, a regularization analysis, and/or the like, as described further herein. This may improve the operation of the digital intelligence platform over an inferior platform that does not use generalized features.

As another example, the digital intelligence platform may select contextualized features for processing profile information values for segments of individuals where data is plentiful. For example, young adults may spend a lot of time online, which may result in these individuals having a large online footprint. Because there is more data available to analyze this particular segment of individuals, low-level contextualized features may serve as a strong indicator of whether these individuals are prospective targets for the campaign. Contextualized features may be combinations of profile information values that serve as indicators of an individual's or a segment of individuals' propensity to make a purchasing decision associated with the campaign.

As shown by reference number 130, the digital intelligence platform may use the one or more subsets of features to train a set of machine learning models. For example, the digital intelligence platform may train the set of machine learning models to output values identifying a predicted level of interest in a good or a service associated with the campaign.

In this way, the digital intelligence platform is able to select generalized and contextualized features, and is able to use the generalized and contextualized features to train machine learning models that may be used to identify prospective targets for the campaign.

As shown in FIG. 1C, and by reference number 135, a client device may generate a request for a list of prospective targets for the campaign. For example, a user may interact with the client device to input one or more parameters identifying search criteria or requirements of the request. The one or more parameters may include a parameter indicating a number of prospective targets or a range of prospective targets to identify, a parameter indicating a particular good or a particular service associated with the campaign, a parameter indicating a particular domain to which the campaign, the particular good, or the particular service relates, a parameter for narrowing a field of candidate prospective targets (e.g., a parameter indicating to consider only individuals of a particular demographic or background), and/or the like.

As shown by reference number 140, the client device may provide the request for the list of prospective targets to the digital intelligence platform. As shown by reference number 145, the digital intelligence platform may identify candidate prospective targets. For example, the digital intelligence platform may, using the one or more parameters included in the request, identify a subset of the group of individuals as candidate prospective targets. Additionally, the digital intelligence platform may obtain profile information for the subset of the group of individuals that have been identified as candidate prospective targets.

As shown by reference number 150, the digital intelligence platform may identify the list of prospective targets. For example, the digital intelligence platform may provide the profile information for each of the candidate prospective targets as input to set of machine learning models to cause the set of machine learning models to output values identifying a predicted level of interest in a good or a service associated with the campaign. In this case, the digital intelligence platform may determine whether the output values satisfy a threshold (e.g., a threshold relating to a degree of interest in the good or the service associated with the campaign), and may identify the list of prospective targets based on determining whether the output values satisfy the threshold.

As shown by reference number 155, the digital intelligence platform may provide information associated with the list of prospective targets to the client device. For example, the digital intelligence platform may provide, to the client device, the list of prospective targets, profile information associated with the list of prospective targets, a recommendation on optimal ways to influence each prospective target (e.g., which medium to use to influence an individual, what time to advertise to the individual, etc.), and/or the like. In some cases, the digital intelligence platform may provide the information associated with the list of prospective targets to the client device in a manner that preserves the anonymity of each individual. In this way, the client device is able to use the information associated with the list of prospective targets for the campaign.

By using the set of machine learning models to identify prospective targets for the campaign, the digital intelligence platform conserves processing resources and/or network resources that might otherwise be used to identify prospective targets that are unlikely to be receptive to a particular campaign.

As indicated above, FIGS. 1A-1C are provided merely as an example. Other examples are possible and may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) in example implementation 100 may perform one or more functions described as being performed by another set of devices of example implementation 100.

Figure 2:
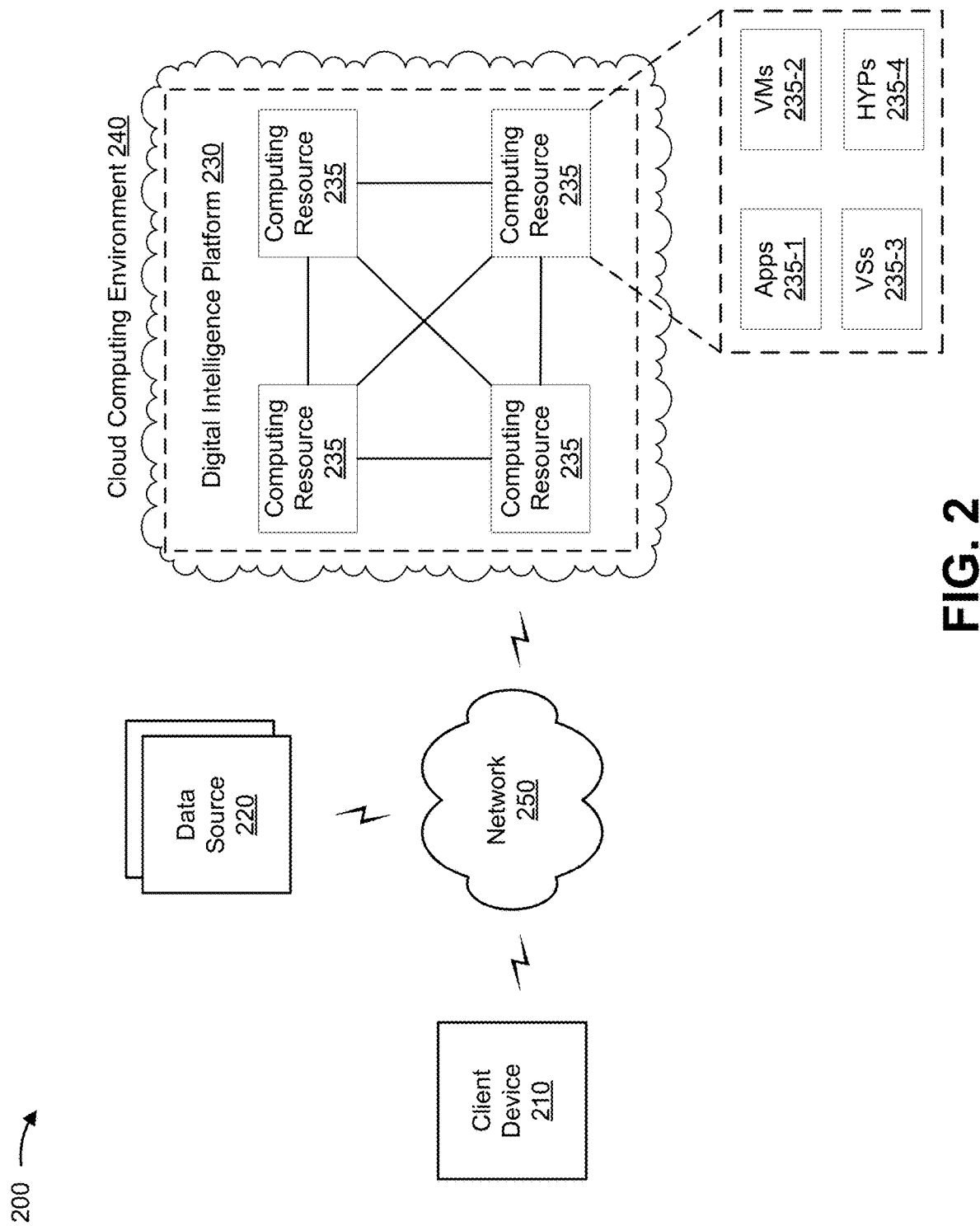
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a data source 220, a digital intelligence platform 230 hosted by a cloud computing environment 240, and/or a network 250. Devices of environment 200 may interconnect via wired connections, wireless connections, or a combination of connections.

Client device 210 includes one or more devices capable of receiving, generating, storing, processing, and/or providing information associated with a list of prospective targets for a campaign. For example, client device 210 may include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may provide, to digital intelligence platform 230, a request for a list of prospective targets for a campaign (e.g., an advertising campaign). In some implementations, client device 210 may receive, from digital intelligence platform 230, information associated with the list of prospective targets for the campaign.

Data source 220 includes one or more devices capable of receiving, generating, storing, processing, and/or providing information associated with a list of prospective targets for a campaign. For example, data source 220 may include a server device or a group of server devices. In some implementations, data source 220 may receive, from digital intelligence platform 230, a request for personal information and/or activity information. In some implementations, data source 220 may provide the personal information and/or the activity information to digital intelligence platform 230. In some implementations, a first data source 220 may store the personal information, and one or more additional data sources may store the activity information.

Digital intelligence platform 230 includes one or more devices capable of receiving, storing, generating, processing, and/or providing information associated with a list of prospective targets for a campaign. For example, digital intelligence platform 230 may include a server device (e.g., a host server, a web server, an application server, etc.), a data center device, or a similar device.

In some implementations, as shown, digital intelligence platform 230 may be hosted in cloud computing environment 240. Notably, while implementations described herein describe digital intelligence platform 230 as being hosted in cloud computing environment 240, in some implementations, digital intelligence platform 230 might not be cloud-based (i.e., may be implemented outside of a cloud computing environment) or might be partially cloud-based.

Cloud computing environment 240 includes an environment that hosts digital intelligence platform 230. Cloud computing environment 240 may provide computation, software, data access, storage, and/or other services that do not require end-user knowledge of a physical location and configuration of system(s) and/or device(s) that host digital intelligence platform 230. As shown, cloud computing environment 240 may include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host digital intelligence platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by client device 210. Application 235-1 may eliminate a need to install and execute the software applications on client device 210. For example, application 235-1 may include software associated with digital intelligence platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., client device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210, data source 220, and/or digital intelligence platform 230. In some implementations, client device 210, data source 220, and/or digital intelligence platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for using a set of machine learning models to identify prospective targets for a campaign. In some implementations, one or more process blocks of FIG. 4 may be performed by digital intelligence platform 230. In some implementations, one or more process blocks of FIG. 4 may be performed by another device or a group of devices separate from or including digital intelligence platform 230, such as client device 210 and/or data source 220.

As shown in FIG. 4, process 400 may include obtaining, from a collection of data sources, personal information and activity information for a group of individuals (block 410). For example, digital intelligence platform 230 (e.g., computing resource 225, processor 320, memory 330, storage component 340, etc.) may obtain, from a collection of data sources 220, personal information and activity information (e.g., user activity information) for a group of individuals, such as a population of individuals or a subset of the population of individuals. In this case, digital intelligence platform 230 may obtain the personal information and the activity information for use in training machine learning models that are able to identify prospective targets for a particular campaign (e.g., an advertising campaign, a marketing campaign, etc.), as described further herein.

In some implementations, a data source 220 may store personal information. The personal information may include personally identifiable information (PII) values for each individual in the group of individuals, such as a name value, an address value, a date of birth value, an e-mail address value, a phone number value, a social media handle value, an internet protocol (IP) address value associated with a device of a particular individual, an income value, and/or the like.

In some implementations, one or more data sources 220 may store activity information. The activity information may include web browsing information, social media information, social engagement information, life events information, life stage and/or financial information, in-person visits information, domain information, and/or the like, as each described in detail below.

In some implementations, a data source 220 may store web browsing information. The web browsing information may include a set of values indicating online activity for the group of individuals. In some cases, the data source 220 may store web browsing information for the group of individuals (or for a subset of the group of individuals) over an interval.

As an example, the web browsing information for a particular individual may include a value identifying an internet protocol (IP) address used while browsing webpages, a time value associated with the web browsing, a value identifying a uniform resource locator (URL) for a webpage that has been visited, a value indicating an interactive advertising bureau (IAB) category (e.g., identifying a classification of goods and/or services provided by a particular webpage that has been visited), a value indicating web browsing search terms, a value indicating device information (e.g., a device name, a device operating system, and/or other types of similar device information), a value indicating domain reference information (e.g., identifying a particular domain to which the browsed webpage relates), and/or the like.

Additionally, the web browsing information may include aggregate values, such as a value indicating a time of day where a particular individual is most active, a value indicating an average amount of time a particular individual takes between web browsing sessions, a value indicating a total number of unique pages viewed, a value indicating a number of URLs visited over an interval (e.g., the past month), a value indicating a number of URLs visited over a first interval as compared to a number of URLs visited over a second interval, a value indicating a commonly-used device for a particular individual, and/or the like.

Additionally, or alternatively, a data source 220 may store social media information. The social media information may include a set of values identifying social media profiles, social media feeds, and/or the like. In some cases, the data source 220 may store social media information for the group of individuals (or for a subset of the group of individuals) over an interval.

As an example, the social media information for a particular individual may include a value identifying a social media handle (e.g., to identify a particular social media account), a value identifying a social media status, a value associated with a social media feed, a time value associated with the social media feed, a value indicating a date on which the social media account was created, a URL associated with the social media account, one or more values identifying followers of the social media account, one or more values identifying individuals or groups that the social media account is following, a value indicating a number of groups to which the social media account belongs, and/or the like.

Additionally, the social media information may include aggregate values, such as a value indicating usage of aspirational words in a social media feed, a value indicating a ratio of a number of social media feeds during a first interval as compared to a ratio of a number of social media feeds during a second interval, a value indicating a social media usage category associated with the social media account, a value indicating a hashtag made by the social media account, a value indicating a number of hashtags made by the social media account over an interval, and/or the like.

Additionally, or alternatively, a data source 220 may store social engagement information. The social engagement information may include a set of values associated with preferences or behaviors of an individual, such as preferences or behaviors relating to social engagements, traveling, social networks, lifestyles, and/or the like. In some cases, the data source 220 may store social engagement information for the group of individuals (or for a subset of the group of individuals) over an interval.

As an example, the social engagement information for a particular individual may include a value associated with an e-mail address, an age value, an employer value, a value indicating a social media handle, a value indicating a preferred brand, a value indicating a trait, a value indicating a type of community associated with the particular individual, a value indicating a preferred travel destination, a value indicating a hobby, a value indicating interest in world culture, and/or the like.

Additionally, the social engagement information may include aggregate values, such as a value indicating a total number of preferred travel destinations, a value indicating a total number of social media handles, a value indicating a number of preferred luxury brands, a value indicating a number of preferred style and fashion brands, a value indicating a domain or genus category to which hobbies of the particular individual relate, and/or the like. As described herein, a "preferred" item may be determined based on an individual purchasing the item, using a device to make a communication relating to the item, accessing the item, specifying the item as a preference, and/or the like.

Additionally, or alternatively, a data source 220 may store life events information. The life events information may include a set of values associated with major life events of an individual, such as a marriage, a divorce, a graduation, purchasing a home, becoming a parent, and/or the like. In some cases, the data source 220 may store life events information for the group of individuals (or for a subset of the group of individuals) over an interval.

As an example, the life events information for a particular individual may include a value indicating a particular life event, a value indicating a date of the particular life event, a value indicating additional information relating to the life event, and/or the like. For example, the life events information may include a value indicating that an individual graduated from a school or university, a value indicating that an individual moved into a new home or apartment, a value indicating that an individual got a new job or promotion, a value indicating that an individual purchased a new vehicle or recently obtained a driver's license or permit, a value indicating that an individual recently had a child or is expected to have a child, and/or the like. As such, the life events information may be obtained by logistics management platform 230, and may provide insight into particular buying decisions that are associated with each particular life event (e.g., an individual with a newborn is likely to purchase baby clothes).

Additionally, or alternatively, a data source 220 may store life stage and/or financial information. The life stage and/or financial information may include a set of values that may be used for profiling and product penetration of the group of individuals. In some cases, the data source 220 may store life stage and/or financial information for the group of individuals (or for a subset of the group of individuals) over an interval.

As an example, the life stage and/or financial information for a particular individual or particular household of individuals may include a value indicating a number of children in a household, a value indicating a number of adults in the household, a value indicating a new child in the household, a value indicating a household income, a value indicating which individual or individuals in the particular household have homeownership status, a value indicating a number of vehicles owned by individuals in the particular household, a value indicating a number of credit cards used by individuals in the household, a value indicating an age range of individuals living in the household, a value indicating a primary household language, a value indicating a change in a type of residence for the particular household of individuals, and/or the like.

Additionally, the life stage and/or financial information may include values representing aggregate data types, such as a change in homeownership status over an interval, a change in a life stage of one or more individuals in the particular household over an interval, a rate of growth of income associated with one or more individuals in the particular household, and/or the like.

Additionally, or alternatively, a data source 220 may store in-person visits information. The in-person visits information may include a set of values associated with offline visits of an individual to one or more business locations. In this way, the data source 220 is able to capture an offline footprint of the individual, characteristics of an intended purchase at the one or more business locations, and/or the like. In some cases, the data source 220 may store in-person visits information for the group of individuals (or for a subset of the group of individuals) over an interval.

As an example, the in-person visits information for a particular individual may include a value indicating a visit to a particular business location at a particular time period (e.g., a visit to an auto dealership), a value indicating a brand associated with the business location (e.g., a particular auto brand), a value indicating a number of visits made to the particular business location over an interval, a value indicating a duration since a first visit or last visit, a value indicating whether the particular business location is associated with a luxury brand or luxury service, and/or the like.

Additionally, or alternatively, one or more data sources 220 may store domain information. The domain information may include a set of values identifying information related to a particular domain. For example, if a client using digital intelligence platform 230 is a loan provider, domain information may include automotive and home listing information, credit bureau information, and/or the like. In this case, the automotive and home listing information may include a set of values associated with online and/or offline listings of properties and/or vehicles that are on sale along with property and/or vehicle details, changes in prices since commencement of a listing, and/or the like. In some cases, the data source 220 may store the automotive and/or home listing information for the group of individuals (or for a subset of the group of individuals) over an interval.

As an example, the home listing information for a particular individual may include a value indicating a name, a value indicating an address, a value indicating a square footage of a home, a value indicating a sales price of a home, a value indicating a publication date of a listing of a home, a value indicating that a home has been repriced, a value indicating a short sale of a home, a value indicating an age of a home, a value indicating an amount of time since a home has been listed, a value indicating an estimated monetary value of a home, a value indicating whether a home is rented, a value indicating that a home is being resold, and/or the like.

As another example, the automotive listing information for a particular individual may include a value indicating a name, a value indicating an address, a value indicating a type of a vehicle, a value indicating a manufacturer of a vehicle, a value indicating a model of a vehicle, a value associated with an age of a vehicle, a value associated with a mileage of a vehicle, a value associated with a condition of a vehicle, and/or the like.

Additionally, or alternatively, a data source 220 may store credit bureau information. The credit bureau information may include a set of values associated with credit risk and fraud attributes at an individual or aggregate level. For example, the credit bureau information may help to design risk criteria for acquisition activities, account management activities, and/or the like. In some cases, the data source 220 may store the credit bureau information for the group of individuals (or for a subset of the group of individuals) over an interval.

As an example, the credit bureau information for a particular individual may include a value indicating a credit score, a value indicating an activity alert, a value indicating a collection alert, a value indicating a particular financial measure taken in a particular situation, a value indicating a household income, a value indicating recent credit activity, and/or the like.

Additionally, the credit bureau information may include values representing aggregate data types, such as a value indicating a total amount defaulted, a value indicating a total number of enquiries made with respect to the particular individual, a value indicating a count of a number of times the particular individual was delinquent over an interval, a value indicating the most recent contact details for collections activities, a value indicating a balance across various credit products associated with the particular individual, a value indicating a worst credit status of the particular individual over an interval, a value indicating an average utilization percentage of credit card limits, and/or the like.

In some implementations, digital intelligence platform 230 may obtain the personal information and the activity information from the collection of data sources 220. For example, digital intelligence platform 230 may obtain the personal information and the activity information by querying the collection of data sources 220. In other cases, one or more of the collection of data sources 220 may be configured to automatically send the personal information and/or the activity information (e.g., in bulk, periodically over an interval, etc.).

In some implementations, digital intelligence platform 230 may apply a set of configurable filters to select particular data sources 220. For example, a client organization using digital intelligence platform 230 may be a loan provider, and an individual employed by the client organization may select data sources 220 that may be useful for creating machine learning models that will identify prospective targets for the loan provider. In this way, use of configurable filters to selection particular data sources 220 allows digital intelligence platform 230 to conserve processing resources associated with creating (and using) the machine learning models relative to creating (and using) the machine learning models with data from all of the data sources. Additionally, digital intelligence platform 230 may obtain information for billions, even trillions of records, that are stored within hundreds of thousands, even millions of files.

In this way, digital intelligence platform 230 is able to obtain personal information and activity information for the group of individuals.

As further shown in FIG. 4, process 400 may include generating profile information for each individual in the group of individuals by associating the personal information and the activity information (block 420). For example, digital intelligence platform 230 (e.g., computing resource 225, processor 320, memory 330, storage component 340, etc.) may standardize the personal information and the activity information into a uniform format, and may use the standardized information to generate profile information (e.g., user profile information) for the group of individuals. The profile information may be used for training a set of machine learning models that are able to identify prospective targets for the campaign, as described further herein.

In some implementations, digital intelligence platform 230 may standardize the obtained information (e.g., the personal information, the activity information, etc.). For example, digital intelligence platform 230 may obtain information associated with different data types, data formats, and/or the like, and may standardize the information to a uniform data type, data format, and/or the like. In some implementations, digital intelligence platform 230 may apply different standardization techniques for different data types or data formats. As an example, digital intelligence platform 230 may standardize the information to a text format, such that the digital intelligence platform 230 is able to apply further analysis to the text. By using an appropriate standardization technique for a particular data type or data format, digital intelligence platform 230 conserves processing resources relative to using an inappropriate standardization technique.

In some implementations, digital intelligence platform 230 may generate the profile information for the group of individuals by associating values included in the personal information with values included in the activity information. For example, digital intelligence platform 230 may compare values included in the personal information with values included in the activity information to associate user activity with particular individuals.

In some cases, profile information values may not correspond directly to activity information values. For example, IP addresses may be volatile in nature, and the same IP address may, over time, be assigned to multiple devices that are associated with different individuals. In these cases, digital intelligence platform 230 may use one or more natural language processing techniques, one or more business rules, and/or the like, to associate user activity with particular individuals, as described below.

As an example, digital intelligence platform 230 may use fuzzy logic to associate personal information values with web browsing information values that are not direct matches with the personal information values. For example, assume that IP address information included in the personal information cannot be directly mapped to IP address information found in web browsing information (e.g., because some IP addresses may, over time, be given to multiple users). Further assume that web browsing information is captured at different time periods. In this case, digital intelligence platform 230 may execute fuzzy logic to compare IP address information and time stamp information included in the personal information with IP address information and time stamp information included in the web browsing information to identify which web browsing information is associated with each individual.

In some cases, digital intelligence platform 230 may also use a business rule defining a threshold time window, where the threshold time window is used to map IP address information over an interval. Furthermore, digital intelligence platform 230 may utilize an onboarder service to further improve match rates of personal information and web browsing information. An Onboarder service may be a third party organization that is able to provide additional information (e.g., offline data, online data, data linking offline and online data, etc.) to digital intelligence platform 230.

As another example, digital intelligence platform 230 may use fuzzy logic to associate values included in the personal information with values included in the in-person visits information. For example, assume the personal information includes a set of geographic coordinates for a home address of an individual, and that the in-person visits information, in addition to including address information for businesses that the individual has visited, also includes one or more sets of geographic coordinates of the individual's home (e.g., which may be obtained by a vendor organization when the individual consents on a mobile device to allow for the individual's location to be tracked).

In this case, the set of geographic coordinates for the home address of the individual may not directly map to the one or more sets of geographic coordinates of the individual's home as reported by the location tracker on the mobile device of the individual. As such, digital intelligence platform 230 may use the fuzzy logic, or a similar type of natural language processing technique, to associate the address information and personal information included in the personal information with the location information and device identifier information included in the in-person visits information.

As a specific example, digital intelligence platform 230 may map a first set of geographic coordinates included in the personal information to one or more additional sets of geographic coordinates included in the in-person visits information based on whether the first set and the one or more additional sets of geographic coordinates satisfy a threshold level of similarity. If the threshold is satisfied, digital intelligence platform 230 may determine a Euclidean distance between the first set of geographic coordinates and the one or more additional sets of geographic coordinates. If the Euclidean distance satisfies a minimum distance threshold, then digital intelligence platform 230 may associate the personal information of the individual with the in-person visits information of the individual.

As another example, digital intelligence platform 230 may execute a name and/or address mapping technique to associate name values and/or address values found in the personal information with name values and/or address values found in the activity information. In this case, name values and/or address values may overlap between the profile information and the activity information, which may allow digital intelligence platform 230 to use the overlapping values to create profile information that includes values from both the personal information and the activity information for each individual of the group of individuals. Additionally, digital intelligence platform 230 may execute the name and/or address mapping technique to identify name value and/or address value variations, such as mapping a name to a nickname, alias, and/or another similar type of variant.

In some implementations, digital intelligence platform 230 may obtain depersonalized profile information that includes credit bureau information for each individual. For example, digital intelligence platform 230 (or another server device that interacts with digital intelligence platform 230) may provide the profile information to a Credit Bureau server, which may cause the Credit Bureau server to provide, to digital intelligence platform 230, the depersonalized profile information that includes the credit bureau information. In this case, the depersonalized profile information may be used to train machine learning models that use data from actual inquiries of buying decisions and/or actual buying decisions, thereby improving accuracy of the machine learning models ability to predict whether an individual is a prospective target for the campaign.

In some implementations, digital intelligence platform 230 may analyze the profile information to generate segment information for particular segments within the group of individuals. For example, digital intelligence platform 230 may group individuals based on demographic characteristics, such as age, marital status, location, home ownership, online activity (e.g., frequency of internet use, time of use, type of device, type of digital activity, etc.), interests and affinities (e.g., sports, hobbies, brands, genres of music, etc.), and/or the like.

In this way, digital intelligence platform 230 is able to generate profile information and segment information that may be used for training machine learning models that are able to identify prospective targets for a campaign.

As further shown in FIG. 4, process 400 may include determining a set of features capable of being used to train a set of machine learning models by analyzing the profile information (block 430). For example, digital intelligence platform 230 (e.g., computing resource 225, processor 320, memory 330, storage component 340, etc.) may obtain a set of features capable of being used to train a set of machine learning models from a domain expert and/or may determine a set of features capable of being used to train the set of machine learning models by performing one or more feature identification techniques.

A feature may be a measurable property or characteristic that may be used for training a machine learning model, such as a property relating to a particular individual or demographic of individuals, a property associated with aggregating a particular type of information, a property identifying a benchmark for a particular individual or class of individuals, a property capable of being used as a signal of interest for a particular good or service, and/or the like. In some cases, a feature may relate to a browsing behavior, an affinity, an interest, a life event, a keyword, a URL, a viewed webpage, a clicked or selected button, a type of content, a device used at a particular time period, and/or the like.

In some implementations, digital intelligence platform 230 may obtain features via a domain expert. For example, a domain expert may provide digital intelligence platform 230 with one or more features relating to a domain in which a client organization operates. As an example, a domain expert may specialize in loans, and may provide digital intelligence platform 230 with one or more features that may be useful indicators in training machine learning models to identify prospective targets that may need loans.

Additionally, or alternatively, digital intelligence platform 230 may determine features by performing one or more feature identification techniques. For example, digital intelligence platform 230 may determine a set of features using a feature identification technique, such as text mining and latent semantic analysis (LSA), a trend variable analysis, an interest diversity analysis, a neural network, a composite indicators analysis, a clustering analysis, and/or the like.

As an example, digital intelligence platform 230 may determine features by performing text mining and LSA. For example, digital intelligence platform 230 may execute a term frequency and inverse document frequency (TF-IDF) technique to process the profile information to identify keywords, such as a keyword useful in identifying an action, trait, habit, and/or trend of one or more individuals, a keyword identifying the particular action, trait, habit, or trend as being associated with a particular domain, and/or the like. Additionally, digital intelligence platform 230 may execute LSA on the keywords to determine one or more topics that may be used as features for training a machine learning model.

As another example, digital intelligence platform 230 may determine features by performing a trend variable analysis. For example, digital intelligence platform 230 may execute a trend variable analysis to determine features associated with changes to information over a particular time period. In this case, digital intelligence platform 230 may aggregate values periodically over a particular time period, and may compare the aggregated values to identify changes in the aggregated values throughout the particular time period. As a specific example, digital intelligence platform 230 may use the trend variable analysis to determine features relating to a change in a number of domain-specific URLs browsed throughout a particular time period, a change in a number of webpages visited over the particular time period that relate to a particular interest or affinity, a change in a number of posts over the particular time period relating to a life event, and/or the like.

As another example, digital intelligence platform 230 may determine features associated with interests and affinities by performing an interest diversity analysis. In this example, digital intelligence platform 230 may compare the profile information to information stored via a data structure (e.g., a taxonomy, a knowledge graph, etc.) that associates broad categories of interests and affinities with keywords associated with the broad categories of interests and affinities. In this way, digital intelligence platform 230 is able to relate profile information values with broad categories of interests and affinities, which may be used as features for training a machine learning model.

As another example, digital intelligence platform 230 may determine features using a neural network. For example, digital intelligence platform 230 may use a neural network to determine a large quantity of features (often referred to as feature explosion). In this case, digital intelligence platform 230 may perform a principal component analysis (PCA) to reduce and combine a large set of features into an aggregated and/or reduced set of features. Additionally, digital intelligence platform 230 may perform multiple iterations of determining the large quantities of features and PCA until a final set of features is determined.

As another example, digital intelligence platform 230 may determine features by performing a composite indicators analysis. In this example, digital intelligence platform 230 may analyze the profile information to determine a degree to which particular profile information values may be indicators of an individual being a prospective target for a particular campaign, good, and/or service. As a specific example, digital intelligence platform 230 may determine that one percent of all individuals applied for a loan for a vehicle, that ten percent of individuals over an age of thirty applied for the loan for the vehicle, that fifteen percent of individuals over the age of thirty and who also clicked on a particular webpage applied for the loan for the vehicle, and/or the like. Additionally, digital intelligence platform 230 may select a profile information value (or combination of profile information values) as a feature if the profile information values (or the combination of profile information values) satisfies a threshold indicator value. In this way, digital intelligence platform 230 is able to identify relationships between values and frequencies of relationships between values, and use the relationships and frequencies of relationships to determine features capable of being used to train a machine learning model to, thereby, improve operation of digital intelligence platform 230.

As another example, digital intelligence platform 230 may determine features by performing a clustering analysis. In this example, digital intelligence platform 230 may determine features by processing the profile information values using variable clustering. Next, digital intelligence platform 230 may use the output from the variable clustering analysis as input for a K-means clustering analysis, which may associate particular profile information values with particular clusters of individuals. In this way, digital intelligence platform 230 is able to use the clustering analysis to determine features to use for training a machine learning model to, thereby, improve operation of digital intelligence platform 230.

Additionally, or alternatively, digital intelligence platform 230 may determine features that are based on combinations of profile information values. For example, digital intelligence platform 230 may use one or more of the above mentioned techniques and/or analyses to determine combinations of profile information values that may be used as features for training a machine learning model. In this way, the combinations of profile information values may serve as indicators of an individual's propensity to make a purchasing decision associated with the campaign.

As an example, digital intelligence platform 230 may analyze the profile information for the group of individuals to determine that one percent of individuals with a preferred device of a mobile device are prospective targets for mortgage loans. Additionally, digital intelligence platform 230 may determine that four percent of individuals with both a preferred device of the mobile device and a preference to browse the Internet at night are prospective targets for mortgage loans. Additionally, digital intelligence platform 230 may determine that fifteen percent of individuals with the preferred device of the mobile device, the preference to browse the Internet at night, and a web browsing history that includes clicking on mortgage webpages are prospective targets for mortgage loans. This percentage may continue to increase as additional values as considered in conjunction with each preceding value (e.g., is the individual married, engaged, tweeting about home ownership or getting married, etc.), and may serve as features that are able to identify prospective targets for mortgage loans (or any other campaign, good, service, etc.).

In this way, digital intelligence platform 230 is able to determine a set of features that are capable of being used to train a set of machine learning models.

As further shown in FIG. 4, process 400 may include training the set of machine learning models using one or more subsets of features of the set of features (block 440). For example, digital intelligence platform 230 (e.g., computing resource 225, processor 320, memory 330, storage component 340, etc.) may, using one or more feature selection techniques, select one or more subsets of features, of the set of features, and may use the one or more subsets of features to train the set of machine learning models. Additionally, digital intelligence platform 230 may select one or more subsets of features that include generic features and/or contextualized features. Additionally, digital intelligence platform 230 may select one or more subsets of features using one or more machine learning techniques that reduce sparsity, that reduce overfitting, and/or the like.

Sparsity may occur in a machine learning model when data is obtained from a large set of data sources that store data at different levels of granularity, which may lead to a large number of features that are unavailable for particular segments of the group of individuals. If a feature is unavailable for particular segments, the feature may be a poor indicator of whether the particular segments of individuals are prospective targets for the campaign. Overfitting may occur in a machine learning model when the machine learning model performs an analysis that is too particular to training data used to train the model. In each of these cases, digital intelligence platform 230 may identify data points where data is sparse and/or may identify data points where over-use of contextualized features is likely to cause overfitting, and may apply generalized features to those data points.

In some implementations, digital intelligence platform 230 may reduce sparsity by selecting generalizable features. For example, digital intelligence platform 230 may select generalizable features by performing a variable selection using random forest (VSURF) analysis, a bootstrapping analysis, and/or the like, as each described below.

As an example, digital intelligence platform 230 may select generalizable features by performing the VSURF analysis. In this example, digital intelligence platform 230 may sort the set of features into M number of subsets of features. Additionally, digital intelligence platform 230 may process each of the M number of subsets of features using random forests that include decision trees, where the decision trees identify a level of importance of each feature. In this case, digital intelligence platform 230 may select, as features to be used to train the machine learning models, variables that satisfy a threshold level of importance.

As another example, digital intelligence platform 230 may select generalizable features by performing the bootstrapping analysis. In this example, digital intelligence platform 230 may sort the set of features into N number of subsets of features. Additionally, digital intelligence platform 230 may apply simple models, such as a gradient boosting machine (GBM), a logistic model, and/or the like, on the N number of subsets of features, where each model has a different default configuration for processing features. In this case, digital intelligence platform 230 may determine which features, of the N number of subsets of features, were found to be important in a threshold number of models. Furthermore, digital intelligence platform 230 may repeat the process of sorting the set of features into subsets and applying different models to the subsets until a threshold number of generalizable features have been selected. In this way, digital intelligence platform 230 is able to select generalizable features that may be used in machine learning models, such that the generalized features may be applied to profile information values where available data is sparse.

Additionally, or alternatively, digital intelligence platform 230 may reduce sparsity by training separate machine learning models using separate groups of features. For example, digital intelligence platform 230 may determine whether features associated with profile information values obtained from a first data source 220 and features associated with profile information values obtained from one or more additional data sources 220 satisfy a threshold level of similarity, and may determine whether to train one machine learning model or multiple machine learning models based on whether the features satisfy the threshold level of similarity.

As an example, if features associated with a first data source 220 do not have a threshold amount of similarity with features associated with a second data source 220, digital intelligence platform 230 may train a first machine learning model with the features associated with the first data source 220 and may train a second machine learning model with the features associated with the second data source 220. As another example, if features associated with the first data source 220 have a threshold amount of similarity with features associated with the second data source 220, then digital intelligence platform 230 may train a machine learning model with the features associated with both the first data source 220 and the second data source 220.

Additionally, or alternatively, digital intelligence platform 230 may select one or more subsets of features for training machine learning models in a way that reduces instances of imbalanced data. For example, digital intelligence platform 230 may reduce instances of imbalanced data by training machine learning models with a synthetic minority oversampling (SMOTE) technique. In this case, digital intelligence platform 230 may generate multiple SMOTE samples of subsets of features, and may apply one or more modeling techniques on the multiple SMOTE samples of subsets of features. Additionally, performance of a final model may be measured on a sample that has not had SMOTE applied, using a Cohen's-Kappa technique, ROC metrics, and/or the like.

Additionally, or alternatively, digital intelligence platform 230 may select one or more subsets of features for training machine learning models in a way that reduces overfitting of data. For example, digital intelligence platform 230 may reduce overfitting of data by performing a regularization (e.g., L1, L2, etc.) analysis. In this case, digital intelligence platform 230 may add a regularization term into a set loss function, and may execute a minimization technique to identify a model that satisfies a threshold level of simplicity.

Additionally, or alternatively, digital intelligence platform 230 may select one or more subsets of features that provide contextualized information. For example, digital intelligence platform 230 may identify a set of profile information values that include a threshold amount of non-null values (or does not include the threshold amount of null values), and may select a subset of contextualized features to apply to the set of profile information values that include the threshold amount of non-null values (or the profile information values that do not include the threshold amount of null values). In some cases, the one or more subsets of contextualized features may be associated with individuals that performed an affirmative action toward a purchase of a product or service, thereby making the one or more subsets of contextualized features strong indicators as to what may cause individuals to purchase a product or a service being sold or marketed via the campaign.

In some cases, contextualized information may be used to associate an individual with a particular part of the interaction cycle, such that the machine learning model may be trained to identify individuals with similar characteristics as prospective targets for the campaign while the individuals with similar characteristics are engaging in the same part of the interaction cycle. Additionally, or alternatively, contextualized information may be used to identify a preferred medium for advertising to a particular individual, a preferred time period to advertise to the particular individual, and/or the like.

In some implementations, digital intelligence platform 230 may train the set of machine learning models. For example, digital intelligence platform 230 may train the set of machine learning models using the one or more subsets of features (e.g., the generalizable features, the contextualized features, and/or the like), as each described above. Additionally, digital intelligence platform 230 may train the set of machine learning models using a supervised training technique, an unsupervised training technique, a classification-based training technique, a logistical regression-based training technique, a Naïve Bayesian classifier technique, a support vector machine (SVM) training technique, a neural network, and/or the like. In this case, the set of machine learning models may be trained to output values indicating a degree to which a particular individual or particular segment of individuals is a prospective target for the campaign.

In some implementations, digital intelligence platform 230 may receive the set of machine learning models after the set of machine learning models have been trained. For example, a device other than digital intelligence platform 230 may train the set of machine learning models, and may provide the set of machine learning models to digital intelligence platform 230. In some cases, the device other than digital intelligence platform 230 may train a portion of the set of machine learning models, and digital intelligence platform 230 may train the remainder of the set of machine learning models.

In this way, digital intelligence platform 230 is able to train the set of machine learning models that are able to identify prospective targets for the campaign. Furthermore, by selectively using generic features and/or contextualized features to process profile information values, digital intelligence platform 230 conserves processing resources and/or network resources relative to an inferior cloud platform that inefficiently processes profile information values in a manner that leads to sparsity and/or overfitting.

As further shown in FIG. 4, process 400 may include generating a list of prospective targets for a campaign by providing profile information for candidate prospective targets as input to the set of machine learning models to cause the set of machine learning models to output values that are to be used to identify the list of prospective targets (block 450). For example, digital intelligence platform 230 (e.g., computing resource 225, processor 320, memory 330, storage component 340, etc.) may receive, from client device 210, a request for a list of prospective targets for the campaign, and may use information included in the request to identify profile information for a subset of the group of individuals (referred herein as candidate prospective targets). In this case, digital intelligence platform 230 may provide the profile information for the candidate prospective targets as input to the set of machine learning models to cause the set of machine learning models to output values identifying a predicted level of interest of each individual of the candidate prospective targets.

In some implementations, digital intelligence platform 230 may receive, from client device 210, a request for prospective targets for a campaign. The request may include one or more parameters that may be used to identify a subset of the group of individuals to use as candidate prospective targets. The one or more parameters may include a parameter indicating a number of prospective targets or a range of prospective targets to identify, a parameter indicating a particular good or a particular service associated with the campaign, a parameter indicating a particular domain to which the campaign, the particular good, or the particular service relates, a parameter for narrowing a field of candidate prospective targets (e.g., a parameter indicating to consider only individuals of a particular demographic or background), and/or the like.

As an example, client device 210 may provide, to digital intelligence platform 230, a request for prospective targets for a campaign designed to sell loans (e.g., automotive loans, home loans, etc.). The request, which has yet to be processed by digital intelligence platform 230, may include a parameter indicating to limit the pool of candidate prospective targets to individuals over the age of twenty five, a parameter indicating to limit the pool of candidate prospective targets to individuals who have experienced certain life events (e.g., college graduation, marriage, etc.), and/or the like. After the request is received, digital intelligence platform 230 may process the request to generate the list of prospective targets, as described below.

In some implementations, digital intelligence platform 230 may use the one or more parameters included in the request to identify profile information for the candidate prospective targets. For example, digital intelligence platform 230 may search (e.g., query) a data structure using the one or more parameters to identify profile information that satisfy criteria of the search. In the example above, digital intelligence platform 230 may identify profile information for individuals that are over the age of twenty five, profile information for individuals that have experienced certain life events, and/or the like.

In some implementations, digital intelligence platform 230 may use the set of machine learning models to identify the list of prospective targets to target with the campaign. For example, digital intelligence platform 230 may provide the profile information of the candidate prospective targets as input to the set of machine learning models to cause the set of machine learning models to output values that may be used to identify the list of prospective targets. In this case, the set of machine learning models may output values for each individual, of the candidate individuals, where the values indicate a likelihood of each individual being a prospective target for the campaign. Additionally, digital intelligence platform 230 may determine whether each value satisfies a threshold, and may select individuals associated with the values that satisfy the threshold as prospective targets for the campaign.

In this way, digital intelligence platform 230 is able to use the set of machine learning models to identify the list of prospective targets.

As further shown in FIG. 4, process 400 may include providing information associated with the list of prospective targets to a client device to allow the client device to use the information associated with the list of prospective targets for a campaign (block 460). For example, digital intelligence platform 230 (e.g., computing resource 225, processor 320, memory 330, storage component 340, communication interface 370, etc.) may provide information associated with the list of prospective targets to client device 210 to allow client device 210 to use the information associated with the list of prospective targets for the campaign. The information associated with the list of prospective targets may include information identifying the list of prospective targets, profile information associated with the list of prospective targets, a recommendation on optimal ways to target each prospective target (e.g., which medium to use to target an individual, what time to advertise to the individual, etc.), and/or the like.

Additionally, or alternatively, digital intelligence platform 230 may generate a recommendation on how to deploy the campaign. For example, digital intelligence platform 230 may generate a recommendation indicating which medium to use to influence each prospective target, a recommendation indicating to make the campaign available to a particular type of device that is a preferred device of a particular individual, a recommendation indicating a time of day where each prospective target is most receptive to advertising, a recommendation that includes profile information of each prospective target (e.g., which may identify additional information that may be used to influence prospective targets, such as a preferred interest or affinity), and/or the like. As an example, if a preferred device of an individual is a mobile device, and the individual frequently browses the web in the evening, using a particular social media platform, digital intelligence platform 230 may generate a recommendation to deploy the campaign to the particular social media platform in the evening, in a manner that is accessible via mobile devices.

Additionally, or alternatively, digital intelligence platform 230 may modify the set of machine learning models using user feedback information. For example, digital intelligence platform 230 may receive user feedback information indicating a level of effectiveness of the campaign, and may modify one or more machine learning models based on the user feedback information to improve effectiveness of subsequent requests for lists of prospective targets. As an example, digital intelligence platform 230 may add a feature to a machine learning model, may remove a feature from the machine learning model, may modify a feature used in the machine learning model, and/or the like, based on the feedback information. In this way, digital intelligence platform 230 is able to utilize user feedback information to improve accuracy of the set of machine learning models.

As an example, digital intelligence platform 230 may receive feedback information indicating that a model did a poor job identifying prospective targets of a particular segment or demographic. In this case, digital intelligence platform 230 modify the model, or may generate a new model (e.g., by modifying features used to retrain the model or features used to train the new model), such that the modified model or the new model may process new profile information (e.g., received from a new request for a list of prospective targets) in a manner that more effectively identifies prospective targets.

In some cases, digital intelligence platform 230 may automatically update a model or generate a new model. For example, digital intelligence platform 230 may receive feedback information indicating a level of effectiveness of a model with respect to a particular segment or demographic of individuals, and may, if the feedback information fails to satisfy a threshold level of effectiveness, automatically update the model or generate the new model. In this way, digital intelligence platform 230 is able to automate a feedback process that may be used to improve accuracy and effectiveness of target identification.

In this way, digital intelligence platform 230 is able to provide information associated with the list of prospective targets to client device 210, such that client device 210 is able to use the information as part of the campaign.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, digital intelligence platform 230 is able to use the set of machine learning models to identify prospective targets for the campaign. Furthermore, digital intelligence platform 230 conserves processing resources and/or network resources that might otherwise be used to identify prospective targets that are unlikely to be receptive to a particular campaign, conserves processing resources and/or network resources relative to an inferior cloud platform that might need re-identify prospective targets after an unsuccessful identification of prospective targets, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent embodiments, implementations, files, data types, and/or the like utilize personal information provided by individuals, it should be understood that such information is to be used in accordance with all applicable laws concerning protection of personal information. Furthermore, in many cases, use of the personal information may be subject to consent of an individual. As an example, an individual may consent via an opt-in or opt-out process. Moreover, storage of personal information may utilize various encryption techniques to protect the security and integrity of the personal information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, operatively connected to the one or more memories, configured to:
obtain, from a collection of data sources, personal information and activity information for a group of individuals;
generate profile information by associating the personal information and the activity information for each individual in the group of individuals;
determine a set of features capable of being used to train a set of machine learning models by using one or more feature identification techniques to analyze the profile information,
where the set of features including generalizable features and contextualized features associated with the group of individuals;
select, using one or more feature selection techniques, one or more subsets of features, of the set of features, to be used for training the set of machine learning models,
where each subset of features, of the one or more subsets of features, identifies measurable properties associated with one or more segments of individuals within the group of individuals, and
where the one or more processors, when selecting the one or more subsets of features, are to:
determine that profile information values for a first segment of individuals include a threshold amount of null values,
select, based on the threshold amount of null values, a first subset of generalized features for the profile information values for the first segment of individuals using at least one of:
a variable selection,
a bootstrapping analysis, or
a regularization analysis,
identify different profile information values for a second segment of individuals that do not include the threshold amount of null values, and
select, based on identifying the different profile information values for the second segment of individuals that do not include the threshold amount of null values, a first subset of contextualized features for the different profile information values for the second segment of individuals;
train the set of machine learning models using the one or more subsets of features,
where at least one machine learning model, of the set of machine learning models, is trained using the first subset of generalized features by automatically identifying data points to apply the first subset of generalized features, where at least one machine learning model, of the set of machine learning models, is trained using the first subset of contextualized features, and
where the set of machine learning models to be trained to output values indicate a degree to which each individual in the group of individuals is a prospective target for a campaign;
receive, from a client device, a request for a list of prospective targets to target for the campaign;
use the set of machine learning models to determine the list of prospective targets for the campaign;
provide the list of prospective targets to the client device to allow the list of prospective targets to be used in the campaign;
receive feedback information indicating a level of effectiveness of the list of prospective targets used in the campaign;
determine whether the feedback information fails to satisfy a threshold level of effectiveness; and
automatically update the set of machine learning models based on determining that the feedback information fails to satisfy the threshold level of effectiveness,
where automatically updating the set of machine learning models includes at least one of adding, removing, or modifying a feature used in a machine learning model, of the set of machine learning models, based on the feedback information.

2. The device of claim 1, where the one or more processors, when generating the profile information, are to:
standardize the personal information and the activity information into a uniform format,
associate personal information values, associated with the personal information, with activity information values, associated with the activity information, using one or more natural language processing techniques,
the one or more natural language processing techniques including a fuzzy matching technique to associate a first one or more personal information values that are not direct matches with a first one or more activity information values, and
generate the profile information for each individual in the group of individuals based on associating the personal information values with the activity information values.

3. The device of claim 1, where the one or more processors, when determining the set of features, are to:
determine, by using a feature identification technique, of the one or more feature identification techniques, one or more features, of the set of features, that are based on combinations of profile information values,
wherein the combinations of profile information values are indicators of a particular individual's or segment of individuals' propensity to make a purchasing decision associated with the campaign.

4. The device of claim 1, where the one or more processors, when selecting the subset of features, are to:
select a subset of contextualized features of the contextualized features,
the subset of contextualized features being associated with individuals that performed an affirmative action toward a purchase of a product or a service; and
where the one or more processors, when training the set of machine learning models, are to:
train a machine learning model, of the set of machine learning models, using the subset of contextualized features.

5. The device of claim 1, where the one or more processors are further to:
generate, after using the set of machine learning models to determine the list of prospective targets, a recommendation indicating how to deploy the campaign,
the recommendation including at least one of:
an instruction indicating a medium to use when influencing a particular individual that is included in the list of prospective targets,
an instruction indicating a time of day during which the particular individual is most likely to be online to view a particular advertisement, or
an instruction indicating to make the campaign available to a particular type of device that is a preferred device of the particular individual; and
where the one or more processors, when providing the list of prospective targets to the client device, are to:
provide the recommendation to the client device.

6. The device of claim 1, where the one or more processors, when selecting the one or more subsets of features, are to:
select, based on the threshold amount of null values, the first subset of generalized features for the profile information values for the first segment of individuals using a variable selection using random forest (VSURF) analysis.

7. The device of claim 1, where the first segment of individuals are individuals over a particular age.

8. A method, comprising:
obtaining, by a device and from a collection of data sources, personal information and activity information for a group of individuals;
generating, by the device, profile information by associating the personal information and the activity information for each individual in the group of individuals;
determining, by the device, a set of features capable of being used to train a set of machine learning models by using one or more feature identification techniques to analyze the profile information,
where the set of features including generalizable features and contextualized features associated with the group of individuals;
selecting, by the device and using one or more feature selection techniques, one or more subsets of features, of the set of features, to be used for training the set of machine learning models,
where each subset of features, of the one or more subsets of features, identifies measurable properties associated with one or more segments of individuals within the group of individuals, and
where selecting the one or more subsets of features includes:
determining that profile information values for a first segment of individuals include a threshold amount of null values, and
selecting, based on the threshold amount of null values, a first subset of generalized features for the profile information values for the first segment of individuals using at least one of:
a variable selection,
a bootstrapping analysis, or
a regularization analysis,
identifying different profile information values for a second segment of individuals that do not include the threshold amount of null values, and
selecting, based on identifying the different profile information values for the second segment of individuals that do not include the threshold amount of null values, a first subset of contextualized features for the different profile information values for the second segment of individuals;

training, by the device, the set of machine learning models using the one or more subsets of features,
where at least one machine learning model, of the set of machine learning models, is trained using the first subset of generalized features by automatically identifying data points to apply the first subset of generalized features,
where at least one machine learning model, of the set of machine learning models, is trained using the first subset of contextualized features, and
where the set of machine learning models to be trained to output values indicate a degree to which each individual in the group of individuals is a prospective target for a campaign;

receiving, by the device and from a client device, a request for a list of prospective targets to target for the campaign;

using, by the device, the set of machine learning models to determine the list of prospective targets for the campaign;

providing, by the device the list of prospective targets to the client device to allow the list of prospective targets to be used in the campaign;

receiving, by the device, feedback information indicating a level of effectiveness of the list of prospective targets used in the campaign;

determining, by the device, whether the feedback information fails to satisfy a threshold level of effectiveness; and automatically updating, by the device, the set of machine learning models based on determining that the feedback information fails to satisfy the threshold level of effectiveness,
where automatically updating the set of machine learning models includes at least one of adding, removing, or modifying a feature used in a machine learning model, of the set of machine learning models, based on the feedback information.

9. The method of claim 8, where generating the profile information includes:
standardizing the personal information and the activity information into a uniform format,
associating personal information values, associated with the personal information, with activity information values, associated with the activity information, using one or more natural language processing techniques,
the one or more natural language processing techniques including a fuzzy matching technique to associate a first one or more personal information values that are not direct matches with a first one or more activity information values, and
generating the profile information for each individual in the group of individuals based on associating the personal information values with the activity information values.

10. The method of claim 8, where determining the set of features includes:
determining, by using a feature identification technique, of the one or more feature identification techniques, one or more features, of the set of features, that are based on combinations of profile information values,
where the combinations of profile information values are indicators of a particular individual's or segment of individuals' propensity to make a purchasing decision associated with the campaign.

11. The method of claim 8, where selecting the subset of features includes:
selecting a subset of contextualized features of the contextualized features,
the subset of contextualized features being associated with individuals that performed an affirmative action toward a purchase of a product or a service; and
where training the set of machine learning models includes:
training a machine learning model, of the set of machine learning models, using the subset of contextualized features.

12. The method of claim 8, further comprising:
generating, after using the set of machine learning models to determine the list of prospective targets, a recommendation indicating how to deploy the campaign,
the recommendation including at least one of:
an instruction indicating a medium to use when influencing a particular individual that is included in the list of prospective targets,
an instruction indicating a time of day during which the particular individual is most likely to be online to view a particular advertisement, or
an instruction indicating to make the campaign available to a particular type of device that is a preferred device of the particular individual; and
where providing the list of prospective targets to the client device includes:
providing the recommendation to the client device.

13. The method of claim 8, where selecting the one or more subsets of features includes:
selecting, based on the threshold amount of null values, the first subset of generalized features for the profile information values for the first segment of individuals using a variable selection using random forest (VSURF) analysis.

14. The method of claim 8, where the first segment of individuals are individuals over a particular age.

15. A non-transitory computer-readable medium storing instructions, the instructions comprising:
one or more instructions that, when executed by one or more processors, cause the one or more processors to:
obtain, from a collection of data sources, personal information and activity information for a group of individuals;
generate profile information by associating the personal information and the activity information for each individual in the group of individuals;
determine a set of features capable of being used to train a set of machine learning models by using one or more feature identification techniques to analyze the profile information,
where the set of features including generalizable features and contextualized features associated with the group of individuals;
select, using one or more feature selection techniques, one or more subsets of features, of the set of features, to be used for training the set of machine learning models,
where each subset of features, of the one or more subsets of features, identifies measurable properties associated with one or more segments of individuals within the group of individuals, and
where the one or more processors, when selecting the one or more subsets of features, are to:

determine that profile information values for a first segment of individuals include a threshold amount of null values, and
select, based on the threshold amount of null values, a first subset of generalized features for the profile information values for the first segment of individuals using at least one of:
a variable selection,
a bootstrapping analysis, or
a regularization analysis,
identify different profile information values for a second segment of individuals that do not include the threshold amount of null values, and
select, based on identifying the different profile information values for the second segment of individuals that do not include the threshold amount of null values, a first subset of contextualized features for the different profile information values for the second segment of individuals;
train the set of machine learning models using the one or more subsets of features,
where at least one machine learning model, of the set of machine learning models, is trained using the first subset of generalized features by automatically identifying data points to apply the first subset of generalized features,
where at least one machine learning model, of the set of machine learning models, is trained using the first subset of contextualized features, and
where the set of machine learning models to be trained to output values indicate a degree to which each individual in the group of individuals is a prospective target for a campaign;
receive, from a client device, a request for a list of prospective targets to target for the campaign;
use the set of machine learning models to determine the list of prospective targets for the campaign;
provide the list of prospective targets to the client device to allow the list of prospective targets to be used in the campaign;
receive feedback information indicating a level of effectiveness of the list of prospective targets used in the campaign;
determine whether the feedback information fails to satisfy a threshold level of effectiveness; and
automatically update the set of machine learning models based on determining that the feedback information fails to satisfy the threshold level of effectiveness,
where automatically updating the set of machine learning models includes at least one of adding, removing, or modifying a feature used in a machine learning model, of the set of machine learning models, based on the feedback information.

16. The non-transitory computer-readable medium of claim 15, where the one or more instructions, that cause the one or more processors to generate the profile information, cause the one or more processors to:
standardize the personal information and the activity information into a uniform format,
associate personal information values, associated with the personal information, with activity information values, associated with the activity information, using one or more natural language processing techniques,
the one or more natural language processing techniques including a fuzzy matching technique to associate a first one or more personal information values that are not direct matches with a first one or more activity information values, and
generate the profile information for each individual in the group of individuals based on associating the personal information values with the activity information values.

17. The non-transitory computer-readable medium of claim 15, where the one or more instructions, that cause the one or more processors to determine the set of features, cause the one or more processors to:
determine, by using a feature identification technique, of the one or more feature identification techniques, one or more features, of the set of features, that are based on combinations of profile information values,
where the combinations of profile information values are indicators of a particular individual's or segment of individuals' propensity to make a purchasing decision associated with the campaign.

18. The non-transitory computer-readable medium of claim 15, where the one or more instructions, that cause the one or more processors to select the subset of features, cause the one or more processors to:
select a subset of contextualized features of the contextualized features,
the subset of contextualized features being associated with individuals that performed an affirmative action toward a purchase of a product or a service; and
where the one or more instructions, that cause the one or more processors to train the set of machine learning models, cause the one or more processors to:
train a machine learning model, of the set of machine learning models, using the subset of contextualized features.

19. The non-transitory computer-readable medium of claim 15, where the one or more instructions, when executed by the one or more processors, further cause the one or more processors to:
generate, after using the set of machine learning models to determine the list of prospective targets, a recommendation indicating how to deploy the campaign,
the recommendation including at least one of:
an instruction indicating a medium to use when influencing a particular individual that is included in the list of prospective targets,
an instruction indicating a time of day during which the particular individual is most likely to be online to view a particular advertisement, or
an instruction indicating to make the campaign available to a particular type of device that is a preferred device of the particular individual; and
where the one or more instructions, that cause the one or more processors to provide the list of prospective targets to the client device, cause the one or more processors to:
provide the recommendation to the client device.

20. The non-transitory computer-readable medium of claim 15, where the one or more instructions, that cause the one or more processors to select the one or more subsets of features, cause the one or more processors to:
select, based on the threshold amount of null values, the first subset of generalized features for the profile information values for the first segment of individuals using a variable selection using random forest (VSURF) analysis.

* * * * *